M. McEVOY.
FOUR HORSE DOUBLETREE.
APPLICATION FILED MAR. 9, 1909.

939,534.  Patented Nov. 9, 1909.

Inventor
Michael McEvoy.

Witnesses:
Joe. P. Walber.
V. B. Hillyard.

By Victor J. Evans
Attorney

UNITED STATES PATENT OFFICE.

MICHAEL McEVOY, OF NEOLA, IOWA.

FOUR-HORSE DOUBLETREE.

939,534.  Specification of Letters Patent.  Patented Nov. 9, 1909.

Application filed March 9, 1909. Serial No. 482,380.

*To all whom it may concern:*

Be it known that I, MICHAEL McEVOY, a citizen of the United States, residing at Neola, in the county of Pottawattamie and State of Iowa, have invented new and useful Improvements in Four-Horse Doubletrees, of which the following is a specification.

This invention appertains to draft appliances, whereby a number of draft animals may work to advantage when arranged abreast instead of in tandem.

The invention is particularly adapted for four horses arranged side-by-side and is illustrated in this connection in the accompanying drawings.

The invention comprises a swingletree, equalizing levers pivotally connected to opposite ends of the swingletree, near their outer ends to provide arms of unequal length, the long arms extending inwardly, draft levers pivotally connected to the outer ends of the short arms of the equalizing levers and adjustably connected at their inner ends to the long arms of the other equalizing levers, and doubletrees adjustably connected with the draft levers and provided at their ends with the usual swingletrees, the parts having a novel construction and arrangement which will appear more fully hereinafter and which will be particularly defined in the appended claim.

Figure 1:
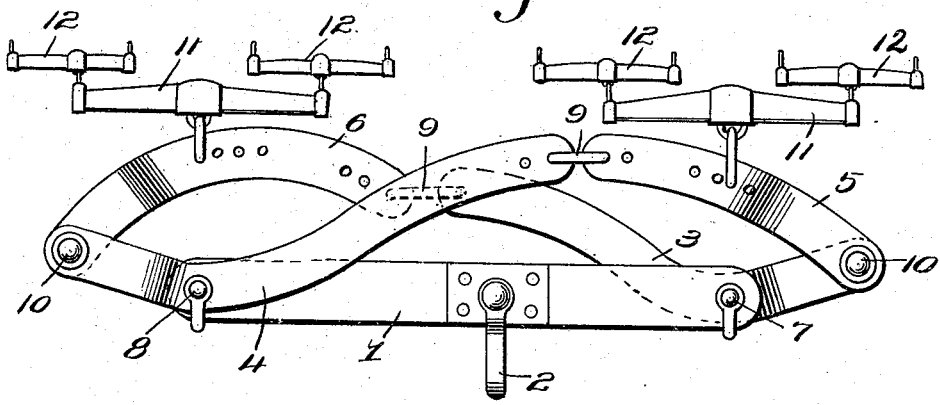
Figure 2:
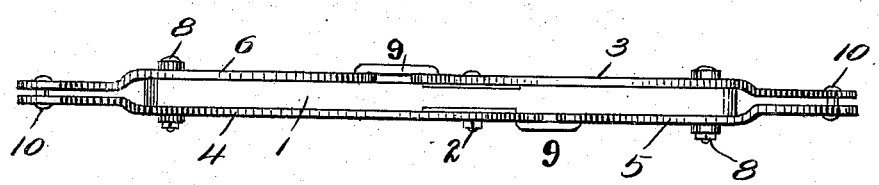

Referring to the drawings, forming a part of the specification:—Figure 1 is a top plan view of a draft appliance embodying the present invention. Fig. 2 is a front view of the appliance inverted and having the doubletrees omitted.

Corresponding and like parts are referred to in the following description and indicated in both views of the drawings by the same reference characters.

The swingletree 1 may be of any construction and is provided with a shackle or clip 2 for attachment of the draft appliance to the machine, implement or vehicle with which the device is intended to be used. Equalizing levers 3 and 4 of similar construction are pivotally connected to opposite ends of the swingletree in such a manner as to provide arms of unequal length, the short arms extending outwardly from the swingle tree and the long arms extending inwardly with their end portions overlapping. Draft levers 5 and 6 are pivotally connected at their outer ends to the short arms of the respective levers 3 and 4 and are adjustably connected at their inner ends to the long arms of the levers 4 and 3.

The equalizing lever 3 is pivotally connected at 7 to one end of the swingletree and the equalizing lever 4 is similarly connected at 8 to the opposite end of the part 1. The arms of the equalizing levers are forwardly diverged from their points of connection with the swingletree thereby enabling the connecting draft levers 5 and 6, to clear the swingletree. The end portions of the long arms of the equalizing levers are rearwardly curved thereby preventing the formation of an excessive space between the doubletrees and the swingletree. Links 9 adjustably connect the opposing ends of the respective levers 4 and 5 and 3 and 6, it being understood that either one or both of the parts may be provided with a series of openings to receive the connecting links. The draft levers are longitudinally curved and are placed with their concaved edges or sides facing rearwardly, thereby providing ample clearance between the respective parts 3 and 5 and 4 and 6. The pivot connections 10 between the draft levers and the equalizing levers may be of any construction so long as the parts are connected in a substantial manner and have a free pivotal movement.

A doubletree 11 is adjustably connected to each draft lever intermediate the ends of the latter and is provided with swingletrees 12 in the accustomed way. By having the doubletree adjustably connected to the draft levers and the latter in turn adjustably connected at their inner ends to the equalizing levers, provision is had for readily adapting the draft appliance to animals of different strength and weight so that the load may be uniformly distributed upon the team. It is noted that the equalizing levers 3 and 4 are arranged upon opposite sides of the swingletree and the connecting draft levers have a like arrangement thereby preventing interference of one set of levers with the other set. The outer ends of the pivotally connected levers are deflected inwardly toward one another so as to lie about in the plane of the swingletree as indicated more clearly in Fig. 2.

Having thus described the invention, what is claimed as new, is:—

A four-horse doubletree or draft appliance constructed substantially as herein set forth, the same comprising a swingletree, equalizing levers arranged upon opposite sides of the swingletree and pivotally connected to the end portions thereof to provide outwardly extending short arms and inwardly projecting long arms having their end portions overlapping, the arms of said levers being forwardly diverged and having the end portions of the long arms rearwardly deflected, draft levers pivotally connected at their outer ends to the short arms of the respective equalizing levers and having their inner ends adjustably connected to the long arms of the opposite equalizing levers, said draft levers being longitudinally curved and arranged with their concaved edges facing rearwardly, and doubletrees adjustably connected with the draft levers intermediate the ends of the latter and provided with swingletrees.

In testimony whereof I affix my signature in presence of two witnesses.

MICHAEL McEVOY.

Witnesses:
  JAS. E. MORGAN,
  E. F. COTTER.